J. E. WEEKES.
HANDLE PROTECTOR.
APPLICATION FILED JULY 29, 1914.
1,200,283.
Patented Oct. 3, 1916.
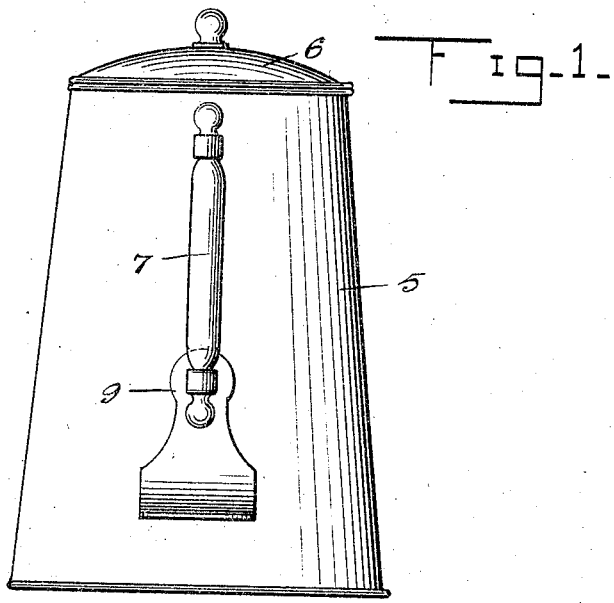
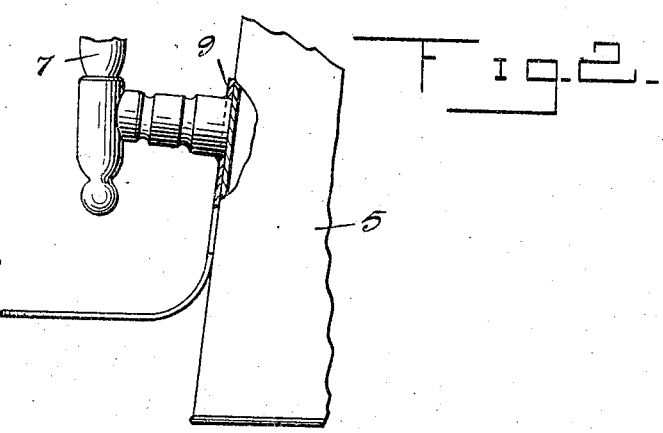
Inventor
J. E. Weekes.
Witnesses
By 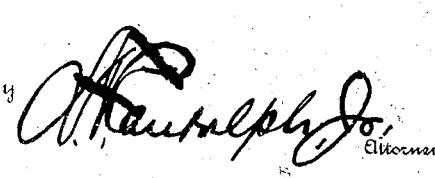
Attorney

UNITED STATES PATENT OFFICE.

JAMES E. WEEKES, OF TOPEKA, KANSAS.

HANDLE-PROTECTOR.

1,200,283.           Specification of Letters Patent.           Patented Oct. 3, 1916.

Application filed July 29, 1914. Serial No. 853,858.

*To all whom it may concern:*

Be it known that I, JAMES E. WEEKES, a citizen of the United States, residing at Topeka, in the county of Shawnee and State of Kansas, have invented certain new and useful Improvements in Handle-Protectors, of which the following is a specification.

This invention relates to a protector especially designed for attachment to coffee and tea pots having wooden handles for protecting the latter against the flame over which the pot is positioned and also for protecting the hand of the person lifting the tea or coffee pot from the flame.

An object of the invention is the provision of a device of this character which shall be of simple construction, inexpensive to manufacture and durable and efficient in use.

With this and other objects in view, the invention consists in the novel construction, arrangement and combination of parts as will be hereinafter specifically described, claimed and illustrated in the accompanying drawings, in which, Figure 1 represents an elevation of a kitchen utensil constructed in accordance with my invention, and, Fig. 2 represents an enlarged detail view thereof, partly broken away.

Referring to the drawing in detail, wherein similar reference numerals designate corresponding parts throughout the several views, the numeral 5 indicates a coffee or tea pot of the usual or any preferred construction having a suitable cover or lid 6 and handle 7, which, as usual, is formed of wood and secured to the side wall of the pot 5 by solder or suitable bolts.

The guard or protector indicated generally by the numeral 8 is substantially L-shaped in formation having one extremity 9 thereof reduced and secured to the side wall of the receptacle 5 under the lower end of the handle 7. The lower portion of the guard or protector 8 is directed outwardly at right angles to the wall of the receptacle 5 and disposed in a horizontal plane. The width of the lower portion of the protector is sufficient to protect the hand of the person removing the receptacle or pot 5 from over the flame and thus prevent injury to the hand.

What I claim is:—

In combination, a receptacle, a handle secured to the outer wall of said receptacle, and a substantially L-shaped protector having one end reduced and provided with a central opening, the lower end of said handle adapted to pass through said opening thereby securing said protector to the vertical wall of said receptacle, the reduced portion of the protector being parallel with the gripping portion of the handle, the opposite end of said protector being substantially rectangular and directed at right angles to the wall of said receptacle and reduced portion, said rectangular portion extending to a point beyond the gripping portion of the handle and being parallel with the top of a heating device thereby preventing the flames and heat from a heating device from injuring said handle and the hand of the operator when handling a receptacle.

In testimony whereof I affix my signature in presence of two witnesses.

JAMES E. WEEKES.

Witnesses:
JAS. L. BROWN,
W. H. WILSON.